United States Patent [19]

Jörnhagen

[11] Patent Number: 4,592,666

[45] Date of Patent: Jun. 3, 1986

[54] SEALING DEVICE FOR SEALING A BEARING

[75] Inventor: Lennart Jörnhagen, Högabergsgatan, Sweden

[73] Assignee: Forsheda AB, Forsheda, Sweden

[21] Appl. No.: 771,476

[22] Filed: Sep. 3, 1985

Related U.S. Application Data

[63] Continuation of Ser. No. 496,365, May 20, 1983, abandoned.

[30] Foreign Application Priority Data

Jun. 3, 1982 [SE] Sweden .............................. 8203421

[51] Int. Cl.⁴ .............................................. F16C 33/78
[52] U.S. Cl. .................................... 384/477; 384/482
[58] Field of Search ............... 384/477, 482, 140, 139, 384/142

[56] References Cited

U.S. PATENT DOCUMENTS

| | | | |
|---|---|---|---|
| 4,235,485 | 11/1980 | Reiter | 308/187.1 |
| 4,325,591 | 4/1982 | Otto | 308/187.2 |
| 4,427,242 | 1/1984 | Otto | 308/187.2 |

Primary Examiner—Lenard A. Footland
Attorney, Agent, or Firm—Pollock, Vande Sande & Priddy

[57] ABSTRACT

A sealing device is adapted to seal a bearing (2) which is adapted to be positioned in an annular space between two cylindrical and concentric surfaces of two machine elements (30, 32) which are rotatable in relation to each other. The sealing device comprises an annular element (16) which is adapted to be connected with one (26) of the substantially cylindrical surfaces, thereby forming a clearance space in relation to a portion (4) of the bearing (2), which is firmly connectable with the other (28) of the substantially cylindrical surfaces.

The annular element (16) and said portion (4) of the bearing (2) include engagement surfaces (22, 24) which are displaceable to and from firm engagement with each other by axial displacement of the annular element and said portion of the bearing in relation to each other. In the engagement position of the engagement surfaces the sealing device and the bearing form a closed unit, in which the sealing device is protected from dirt, dust and the like during storing and transportation of the unit.

2 Claims, 4 Drawing Figures

SEALING DEVICE FOR SEALING A BEARING

This is a continuation of co-pending application Ser. No. 496,365 filed on May 20, 1983 now abandoned.

The present invention relates to a sealing device for sealing a bearing which is adapted to be positioned in an annular space between two opposed, substantially cylindrical and concentric surfaces of two machine elements which are rotatable in relation to each other.

For rotatably journalling two machine elements in relation to each other there is positioned a bearing in an annular space which is defined by two substantially cylindrical and concentric surfaces of the two machine elements, the bearing being positioned in engagement with the said surfaces. Thereby, it is of great importance to seal the bearing in an effective way against the loss of lubricant and the penetration of dust and dirt, steam and so on for providing the bearing with a satisfying service life. In order to effect this purpose it is previously known to close the bearing by means of a sealing device comprising an annular element consisting of a substantially rigid material and usually also comprising a sealing ring consisting of an elastic material. Thereby, the annular element consisting of a substantially rigid material is positioned in firm connection with one of the substantially cylindrical surfaces while forming a clearance space in relation to the other of the substantially cylindrical surfaces or an element which is fixedly connected therewith and for example is constituted by a portion of the bearing. The sealing ring consisting of elastic material is fixedly positioned in relation to one of the cylindrical surfaces and contacting the other of the cylindrical surfaces or an element connected therewith in such a way that it is sliding against said surface or the element connected therewith when the machine elements are rotating in relation to each other. Not until the bearing and the sealing device are connected with the machine elements which are rotatable in relation to each other the bearing and the sealing device will be fixed in relation to each other, and it is also not until this occurs that the sealing device can provide any sealing of the bearing. These circumstances represent a substantial draw-back, on one hand with regard to the fact that several separate elements have to be stored and handled before the bearing and the sealing device are mounted and on the other hand because of the fact that the bearing is completely unprotected while it is handled and stored and therefore the bearing must be handled and stored with great care if the bearing shall not already before the mounting be made dirty and thereby get a shortened service life after the mounting.

The object of the present invention is to provide a sealing device for sealing a bearing, which is not impaired by the above draw-backs.

In order to comply with this object the sealing device according to the invention is characterized in that the annular element which is adapted fixedly to be connected to relation to the one of the substantially cylindrical surfaces and thereby to form a clearance space in relation to a portion of the bearing which is fixedly connectable with the other of the substantially cylindrical surfaces, and the portion of the bearing are formed with engagement surfaces which are adapted to be displaced to and from a firm engagement with each other by axial displacement of the annular element and said portion of the bearing in relation to each other.

In a sealing device according to the invention said engagement surfaces make it possible to combine the bearing and the sealing device to a unit in which the bearing is sealed in relation to the environment, before the bearing and the sealing device are connected with the machine elements. When the unit consisting of the bearing and the sealing device has been connected with the two machine elements, the engagement between the annular element and said portion of the bearing is interrupted by axially displacing the annular element and said portion of the bearing in relation to each other in order to form the clearance space between the annular element and said portion of the bearing which is necessary for the relative rotation therebetween.

The invention is described in the following with reference to the accompanying drawings.

Figure 1:
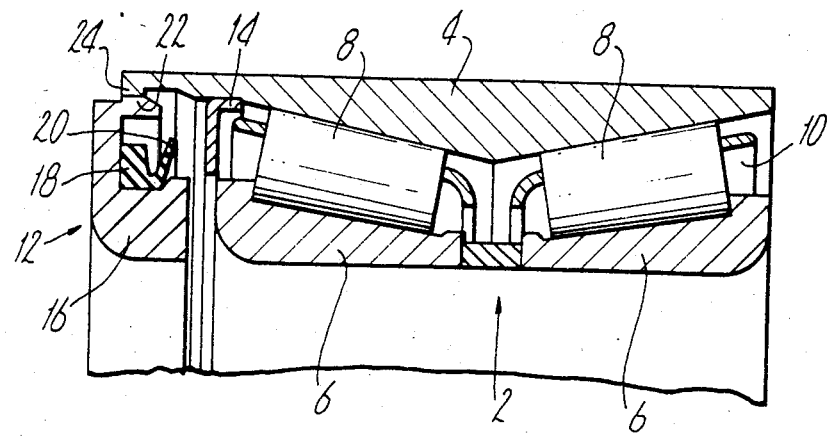
FIG. 1 is a part of an axial section of an embodiment of a bearing provided with a sealing device according to the invention.

In FIG. 1 there is shown an axial section of the portion of a roller bearing 2 which in a conventional way comprises an outer ring 4, inner rings 6 and rolling elements 8 positioned between the outer ring 4 and the inner rings 6 and retained in correct relationship by means of cages 10. The bearing 2 is sealed by means of a sealing device 12 which is designed in accordance with the present invention. The sealing device 12 comprises a washer 14 clamped in the outer ring of the bearing 2 and preferrably consisting of metal or another rigid material, an annular element 16 also consisting of a substantially rigid material, preferrably metal, and a sealing ring 18 of an elastic material, for example rubber, tensioned on to cylindrical surface of the annular element 16. The sealing ring 18 contacts a side surface of the washer 14 by means of an elastic sealing lip 20.

In the position shown in FIG. 1 an outwardly directed, peripheral projection 22 at the outer periphery of the annular element 16 is in a relatively firm engagement with an inwardly directed, peripheral projection 24 at the edge portion of the outer ring 4 of the bearing. This engagement provides that in the position shown in FIG. 1 the sealing device 12 is firmly but releasably connected with the bearing 2 so that the sealing device and the bearing constitute one unit in which the bearing is substantially sealed with regard to penetrating dirt during the storing and transportation of the unit.

Figure 2:
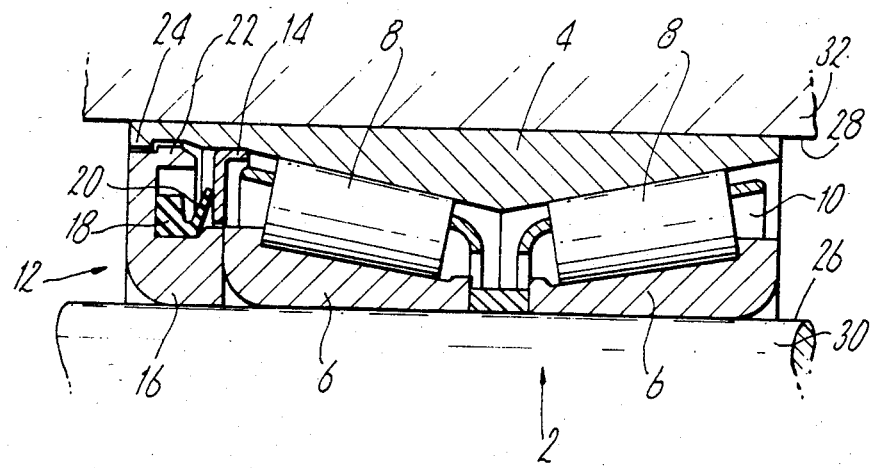
FIG. 2 is a section corresponding to FIG. 1 of the bearing provided with a sealing device according to the invention in its mounted position.

In FIG. 2 the bearing and the sealing device 12 are shown positioned in an annular space between two opposed, cylindrical and concentric surfaces 26 and 28, the surface 26 being the outer surface of a shaft and the surface 28 being the surface of an opening in a housing 32. Thus, the shaft 30 is rotatably mounted in the housing 32 by means of the bearing 2. The outer ring 4 of the bearing 2 is fixed in the surface 28 of the housing 32 and the inner rings 6 of the bearing are fixed on the outer surface 26 of the shaft 30. The annular element 16 is tensioned on to the surface 26 of the shaft 30 and engages one of the inner rings 6 of the bearing by means of its inner side surface in order to fix the bearing against axial displacement. In the position shown in FIG. 2 the annular element 16 has been moved axially into the outer ring 4 of the bearing 2 so that the projection 22 of the annular element 16 and the projection 24 of the outer ring 4 is no longer in engagement with each other but contribute to the forming of a clearance space between the annular element 16 and the opposite surface portion of the outer ring 4 to allow the necessary, relative rotation between the annular element 16 and the outer ring 4 of the bearing 2.

Also in the mounted position of the bearing 2 and the sealing device 12 the sealing ring 18 engages the washer 14 in order to seal the bearing. Thus, when the shaft 30 is rotated the annular element 16 and the sealing ring 18 following the rotation of the shaft, the lip 20 of the sealing ring 18 thereby sliding against the outer side surface of the washer 14.

The axial displacement of the annular element 16 from the position shown in FIG. 1 to the position shown in FIG. 2 can be provided in a simple way by means of a light impact on the annular element 16 when the bearing 2 and the sealing device 12 are mounted. In contrast to constructions previously known the bearing 2 and the sealing device 12 constitute a unit before as well as after the mounting, in which unit the bearing is protected from dirt by means of the sealing device.

Figure 3:
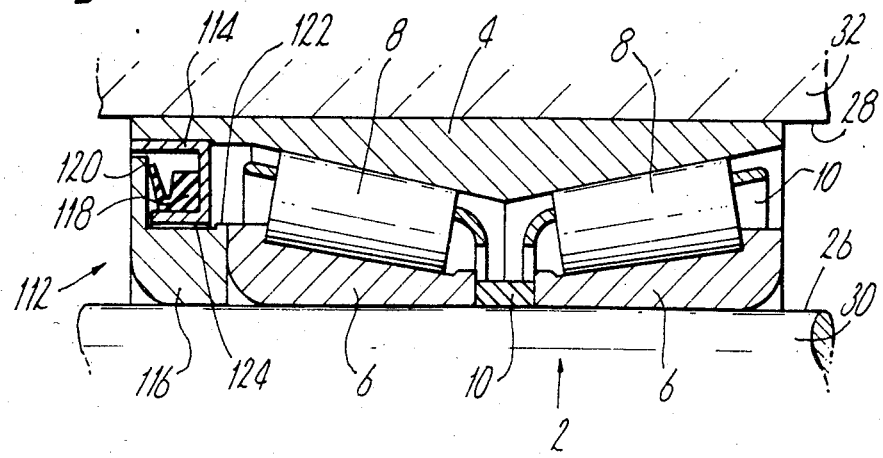
FIG. 3 is a section corresponding to FIG. 2 of a bearing provided with an other embodiment of a sealing device according to the invention in its mounted position.

In FIG. 3 there is shown an axial section corresponding to FIG. 2 of a portion of a bearing of the same kind as the bearing according to FIG. 2. The bearing according to FIG. 3 and the portions thereof are provided with the same reference numerals as the bearing according to FIG. 2 and the portions thereof. Like the bearing shown in FIG. 2 the bearing shown in FIG. 3 is adapted for journalling a shaft 30 in a housing 32 and has its outer ring 4 fixed in the cylindrical surface 28 in the housing 32 and its inner rings 6 fixed on the cylindrical surface 26 of the shaft 30. The bearing according to FIG. 3 is sealed by means of a sealing device which is somewhat modified in relation to the sealing device according to FIGS. 1 and 2. The sealing device according to FIG. 3 comprises an annular element 116 consisting of a substantially rigid material, preferrably metal, which element is tensioned on to the cylindrical surface 26 of the shaft 30 and has a side surface engaging one of the inner rings 6 of the bearing 2. The annular element 16 has an outwardly projecting, peripheral projection 122 at the side positioned adjacent the bearing 2. The sealing device 112 also comprises a ring 114 of a substantially rigid material mounted in the outer ring 4 of the bearing 2. In the ring 114 there is positioned a sealing ring 118 consisting of rubber or another elastic material. The sealing ring 118 comprises a sealing lip 120 engaging a surface of the annular element 116 in order completely to seal the bearing 2. Thus, when the shaft 30 is rotated the sealing lip 120 of the sealing 110 is slided against said surface of the annular element 116.

Before the bearing 2 and the sealing device 112 are mounted on the shaft 20 and in the housing 32 the annular 116 is displaced axially outwards in such a way that the projection 122 is firmly but releasably engaging the inwardly directed cylindrical surface 124 of the ring 114. Thereby, the bearing 2 and the sealing device 12 will before mounting constitute a unit in which the bearing is sealed by means of the sealing device 112 so that it is not subject to dirt during transportation and storing. In connection with the mounting of the bearing 2 and the sealing device 112 the annular element 116 is displaced in the axial direction to the position shown in FIG. 3 for allowing a relative rotation between the ring 114 and the annular element 116 at the rotation of the shaft by forming a clearance space between the ring 114 and the annular element 116.

Figure 4:
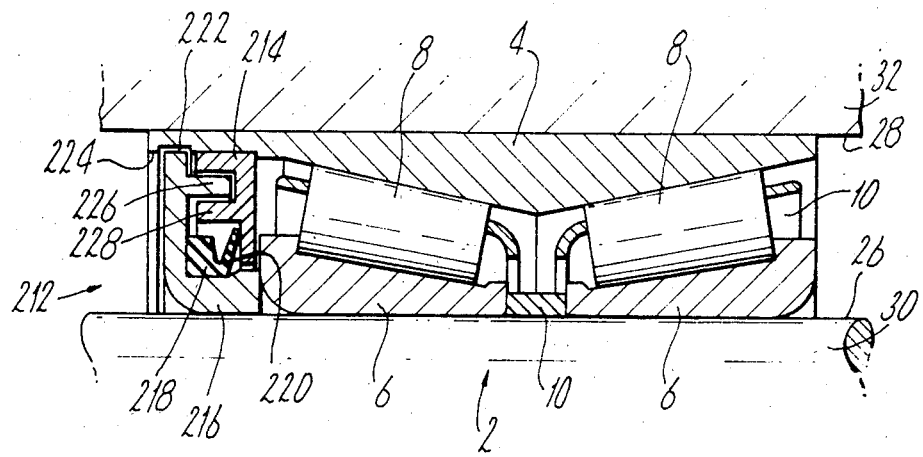
FIG. 4 is a section corresponding to FIG. 2 and 3 of a bearing provided with a modified embodiment of a sealing device according to the invention in its mounted position.

Also in FIG. 4 there is shown an axial section of a bearing 2 adapted rotatably to journal a shaft 30 in relation to a housing 32.

The bearing 2 is sealed by means of sealing device 212 comprising an annular element 216 consisting of a substantially rigid material, preferrably metal, which annular element is tensioned on to the shaft 30 and engages an inner ring 6 of the bearing 2, a ring 214 mounted in the outer ring 4 of the bearing 2 and also consisting of a substantially rigid material, preferrably metal, and a sealing ring 218 consisting of an elastic material, for example rubber, which sealing ring 218 is tensioned on to the annular element 216 and comprises a sealing lip 220 engaging a surface of the ring 214. The annular element 216 and the ring 214 are formed with laterally projecting portions 226 and 228, respectively, co-operating for forming a sealing labyrinth. At its outer edge the outer ring 4 of the bearing 2 has an inwardly directed projection 224 which engages the outer peripheral surface 222 of the annular element 216 when the annular element 216 is axially displaced in the direction from the bearing 2.

Before the bearing 2 and the sealing device 212 are mounted the annular element 216 is provided in the position in which the surface 222 thereof engages the projection 224 so that the bearing 2 and the sealing device 212 form a unit, in which the bearing 2 is sealed from being penetrated by dirt during transportation and storing.

The invention can be modified within the scope of the following claims.

I claim:
1. A bearing arrangement comprising:
first and second opposed substantially cylindrical concentric surfaces of two machine elements which form an annular zone and are rotatable with respect to each other;
a bearing positioned in said annular zone, said bearing comprising first and second rings connected firmly to said first and second cylindrical surfaces respectively; and
means for sealing said bearing both when said bearing is unassembled alternatively when assembled with said machine elements said means comprising a sealing device positioned in said annular zone at an outer end thereof, said sealing device comprising an axially movable annular element consisting of a substantially rigid material in firm contact with said first of said substantially cylindrical surfaces and extending radially therefrom to form a clearance space in relation to a portion of the bearing which is connected firmly to the second of the substantially cylindrical surfaces, said annular element and said portion 4 of the bearing connected firmly with the second of the substantially cylindrical surfaces being provided with engagement surfaces which are movable to and from firm engagement with each other by axially moving the annular element, and said portion of the bearing in relation to each other.

2. A bearing arrangement claimed in claim 1, wherein the engagement surface of the portion of the bearing which is firmly connectable with the second of the substantially cylindrical surfaces is formed on a projection of an outer ring of the bearing.

* * * * *